US011973543B2

United States Patent
Rofougaran et al.

(10) Patent No.: US 11,973,543 B2
(45) Date of Patent: *Apr. 30, 2024

(54) COMMUNICATION DEVICE AND METHOD FOR ECHO SIGNALS MANAGEMENT

(71) Applicant: Movandi Corporation, Irvine, CA (US)

(72) Inventors: Ahmadreza Rofougaran, Newport Beach, CA (US); Maryam Rofougaran, Rancho Palos Verdes, CA (US); Sam Gharavi, Irvine, CA (US); Qiyue "Jack" Zou, Elk Grove, CA (US); Alan Wang, Irvine, CA (US); Farid Shirinfar, Granada Hills, CA (US); Mike Boers, South Turramurra (AU)

(73) Assignee: Movandi Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,207

(22) Filed: Feb. 6, 2023

(65) Prior Publication Data

US 2023/0261698 A1    Aug. 17, 2023

Related U.S. Application Data

(63) Continuation of application No. 17/412,501, filed on Aug. 26, 2021, now Pat. No. 11,575,411, which is a
(Continued)

(51) Int. Cl.
*H04B 7/015* (2006.01)
*H04B 7/155* (2006.01)
(Continued)

(52) U.S. Cl.
CPC ......... *H04B 7/015* (2013.01); *H04B 7/15571* (2013.01); *H04B 17/318* (2015.01);
(Continued)

(58) Field of Classification Search
None
See application file for complete search history.

(56) References Cited

U.S. PATENT DOCUMENTS 11,171,691 B2    11/2021 Rofougaran et al.
2006/0052066 A1    3/2006 Cleveland et al.
(Continued)

OTHER PUBLICATIONS

Notice of Allowance for U.S. Appl. No. 17/412,501 dated Oct. 3, 2022.
(Continued)

*Primary Examiner* — Mohammad S Adhami
(74) *Attorney, Agent, or Firm* — CHIP LAW GROUP

(57) ABSTRACT

A communication device includes a service transmitter (Tx) configured to transmit a second beam of RF signals in a first radiation pattern to a user equipment (UE). The communication device further includes a control circuitry configured to: detect an amount and direction of echo signals at the donor receiver Rx corresponding to reflected RF signals in an environment surrounding a communication device; determine an installation location for the communication device based on echo signal measurements at one or more different locations; adjust polarization of the second beam of RF signals to minimize the echo signals at the donor receiver Rx based on the echo signal; and generate a second radiation pattern for at least the second beam of RF signals based on the amount and direction of the echo signals in the environment detected at the donor receiver Rx.

21 Claims, 8 Drawing Sheets

Related U.S. Application Data continuation of application No. 16/398,195, filed on Apr. 29, 2019, now Pat. No. 11,171,691.

(51) Int. Cl.
*H04B 17/318* (2015.01)
*H04W 24/10* (2009.01)
*H04W 72/044* (2023.01)
*H04W 76/15* (2018.01)

(52) U.S. Cl.
CPC ......... *H04W 24/10* (2013.01); *H04W 72/046* (2013.01); *H04W 76/15* (2018.02)

(56) References Cited

U.S. PATENT DOCUMENTS

| | | |
|---|---|---|
| 2008/0297256 A1 | 12/2008 | Eken et al. |
| 2013/0128934 A1 | 5/2013 | Kang et al. |
| 2014/0126464 A1* | 5/2014 | Barrett .................. H04W 16/26 370/315 |
| 2015/0230105 A1* | 8/2015 | Negus .................. H04W 72/20 370/329 |
| 2021/0144537 A1* | 5/2021 | Ben Tolila ........... H04B 17/318 |

OTHER PUBLICATIONS

Non-Final Office Action for U.S. Appl. No. 16/398,195 dated Mar. 18, 2021.
Non-Final Office Action for U.S. Appl. No. 17/497,102 dated Sep. 22, 2022.
Notice of Allowance for U.S. Appl. No. 16/398,195 dated Jul. 7, 2021.
Notice of Allowance for U.S. Appl. No. 17/497,102 dated Jan. 3, 2024.

* cited by examiner

US 11,973,543 B2

COMMUNICATION DEVICE AND METHOD FOR ECHO SIGNALS MANAGEMENT

REFERENCE

This Patent Application makes reference to, claims priority to, claims the benefit of, and is a Continuation Application of U.S. patent application Ser. No. 18/165,207, filed Feb. 5, 2023 which is a Continuation of U.S. patent application Ser. No. 17/412,501, filed Aug. 26, 2021, now U.S. Pat. No. 11,575,411 issued on Feb. 7, 2023, which is a Continuation of U.S. patent application Ser. No. 16/398,195, filed Apr. 29, 2019, now U.S. Pat. No. 11,171,691 issued on Nov. 9, 2021.

The above referenced Application is hereby incorporated herein by reference in its entirety.

FIELD OF TECHNOLOGY

Certain embodiments of the disclosure relate to a communication device in a wireless telecommunication system. More specifically, certain embodiments of the disclosure relate to a communication device and a method for echo signals management.

BACKGROUND

Wireless telecommunication has witnessed the advent of various signal transmission techniques and methods, such as use of beam forming and beam steering techniques, for enhancing capacity of radio channels. The wireless telecommunication systems which use techniques such as beamforming and beam steering for signal transmission may have one or more limitations. For example, a beam of RF signals transmitted by a base station, may be highly directional in nature and may be limited in transmission range or coverage. In certain scenarios, an RF receiver device (e.g. a user equipment) may be situated at a distance which is beyond transmission range of the base station, and hence reception of the RF signal at the RF receiver device (e.g. a user equipment) may be adversely affected. Further, one or more obstructions (such as buildings and hills) in path of the RF beam transmitted by the base station, may be blocking reception of the RF signal at the RF receiver device.

Typically, a communicational device, such as a repeater device or a signal booster device, is used to increase the transmission range of the base station and to overcome the problem of the one or more obstructions. However, there is a limitation on the amount of signal boosting that may be done, and a location sensitive issue experienced by a conventional communication device. For example, the RF signals that are transmitted by the transmitter side of a conventional communication device may get reflected from surroundings and may re-appear at the receiver side of the conventional communication device as echo signals. The echo signals may cause self-interference with the RF signals received at the receiver side of the conventional communication device. Thus, upon mixing with the RF signals at the receiver side, the echo signal may cause a decrease in a signal to noise ratio (SNR) of the actual RF signals that are received at the receiver side of the conventional communication device, which is not desirable. The presence of reflective surfaces near the location of installation of the conventional communication device (i.e. a location sensitive issue) usually increases the echo signals. Thus, for the current as well as the future communication networks (e.g. 4G, 5G-ready, 5G, 6G, etc.), there is required an advanced communication device that can overcome the one or more limitations of conventional systems.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A communication device and a method for echo signals management, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a communication device and a method for echo signals management. The disclosed communication device effectively suppresses the echo signals even in a highly reflective environment using a combination of polarization and a change in radiation pattern of transmitted signal for maximization of the signal coverage and minimization of the echo signals. In the following description, reference is made to the accompanying drawings, which form a part hereof, and in which is shown, by way of illustration, various embodiments of the present disclosure.

Figure 1:
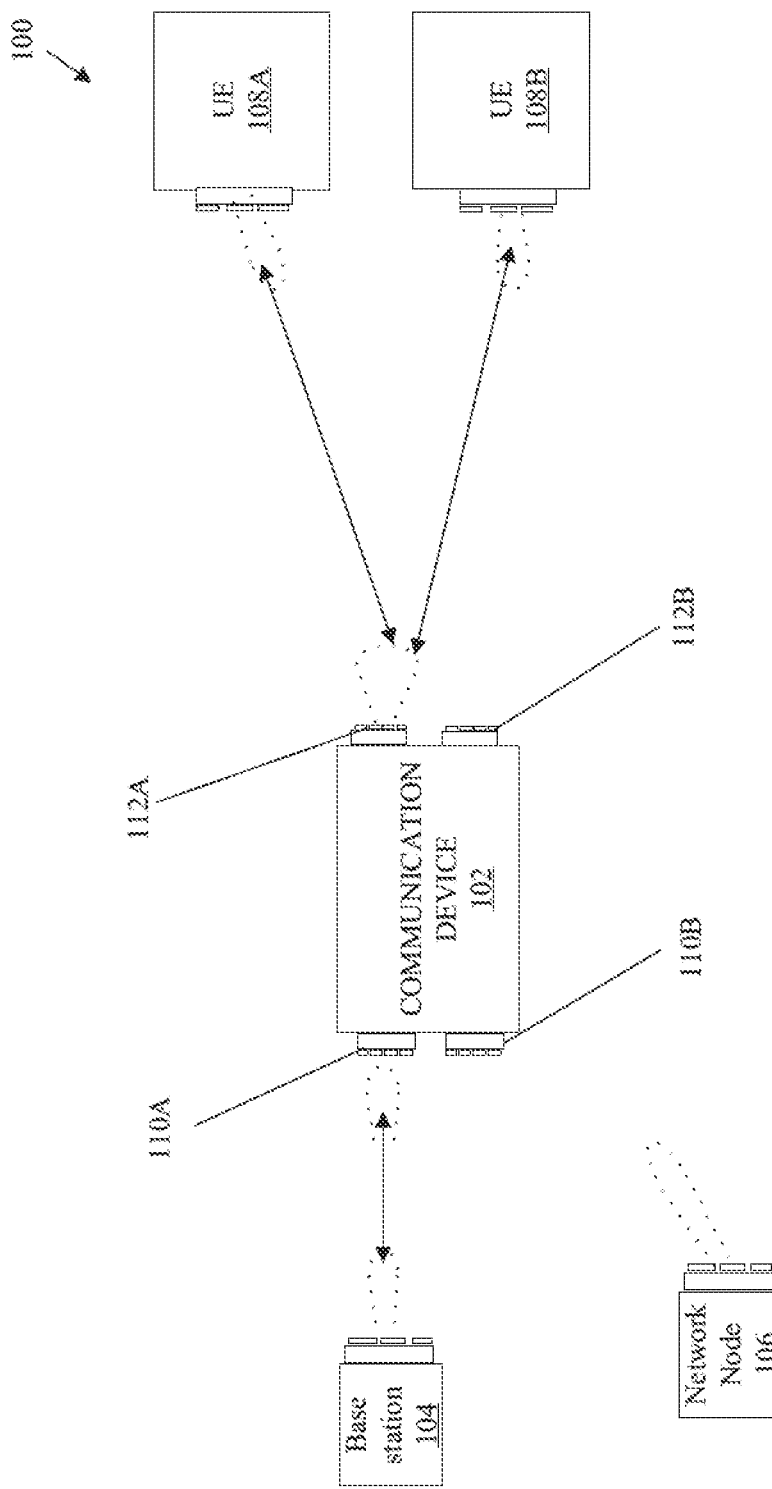
FIG. 1 is a network environment diagram that illustrates an exemplary communication device communicatively coupled to a base station and one or more user equipment (UE), in accordance with an exemplary embodiment of the disclosure.

FIG. 1 is a network environment diagram that illustrates an exemplary communication device communicatively coupled to a base station and one or more user equipment (UE), in accordance with an exemplary embodiment of the disclosure. With reference to FIG. 1, there is shown a network environment diagram 100 that may include a communication device 102, a base station 104, a network node 106, and one or more user equipment (UEs) 108A and 108B. The communication device 102 may include a donor receiver (Rx) 110A, a donor transmitter (Tx) 110B, a service Tx 112A, and a service Rx 112B.

The communication device 102 may be at least one of a repeater device, a RF signal booster device, an Evolved-universal terrestrial radio access-New radio Dual Connectivity (EN-DC) device, a New Radio (NR)-enabled relay node, or a mmWave-enabled communication device. The communication device 102 may facilitate communication in both sub 30 gigahertz to above 30 gigahertz. The band of radio frequencies in the electromagnetic spectrum from 30 to 300 gigahertz is usually referred to as extremely high frequency (EHF) communication. Such radio frequencies have wavelengths from ten to one millimeter, referred to as millimeter wave (mmW).

The communication device 102 may be configured to receive input RF signals. In one example, the communication device 102 may receive the input RF signals from the base station 104. In another example, the communication device 102 may receive input RF signals from the network node 106. In accordance with an embodiment, the communication device 102 may be deployed between the base station 104 (e.g. an gNB) and the one or more UEs 108A and 108B to mitigate lack of line-of-sight (LOS) between the base station 104 and the UEs 108A and 108B.

In accordance with an embodiment, the communication device 102 may comprise a digital modem circuitry, for example, an embedded 5G modem. The digital modem circuitry may utilize the received signal (i.e. the received first beam of input RF signals) for control and monitoring operations, such as configuring and monitoring beamforming functions. In accordance with an embodiment, the communication device 102 may be realized by various components, such as transmitter front-ends, receiver front-ends, a digital signal processor, a plurality of low-noise amplifiers, a plurality of phase shifters, a plurality of power combiners, a plurality of power dividers, and a plurality of power amplifiers, logical control units, 4G and/or 5G modems, phased lock loop (PLL) circuits, mixers, analog to digital converters (ADC), and digital to analog circuitry (DAC).

The base station 104 may be a fixed point of communication that may relay information, in form of a plurality of beams of RF signals, to and from communication devices, such as the communication device 102 and the one or more remote UEs 108A and 108B. Multiple base stations corresponding to one or more service providers, may be geographically positioned to cover specific geographical areas. Typically, bandwidth requirements serve as a guideline for a location of the base station 104 based on relative distance between the one or more remote UEs 108A and 108B and the base station 104. The count of base stations may be dependent on, for example, population density and geographic irregularities, such as buildings and mountain ranges, which may interfere with the plurality of beams of RF signals.

The network node 106 may be another communication device, such as the communication device 102. For example, the network node 106 may be a repeater device or a signal booster device installed in a wireless telecommunications network.

Each of the one or more UEs 108A and 108B may correspond to a telecommunication hardware used by an end-user to communicate (e.g. a mobile equipment). Alternatively stated, each UE 108A or 108B may refer a combination of the mobile equipment and subscriber identity module (SIM). Each of the one or more UEs 108A and 108B may be configured to communicate with the communication device 102 by use of RF signals. Examples of the one or more UEs 108A and 108B may include, but are not limited to a smartphone, a customer-premises equipment (CPE), a wireless modem, a home router, a cable or satellite television set-top box, a VoIP base station, or any other customized hardware for telecommunication.

The donor Rx 110A may include suitable logic, circuitry, and/or interfaces that may be configured to receive a first beam of input RF signals from the base station 104 or the network node 106. In accordance with an embodiment, the donor Rx 110A may refer to a receiver that may only communicate with the base station 104 or the network node 106. In accordance with an embodiment, the donor Rx 110A may be a receiver (Rx) phased array. Examples of implementations of the donor Rx 110A may include, but is not limited to a linear phased array antenna, a planar phased array antenna, a frequency scanning phased array antenna, a dynamic phased array antenna. In accordance with an embodiment, the Rx phased array may include a receiver chain comprising an antenna array, a first set of low noise amplifiers (LNA), a first set of receiver front end phase shifters, and a first set of power combiners. The donor Tx 110B may be similar to the service Tx 112A, but may be configured to transmit one or more beams of RF signals in uplink communication to the base station 104 or the network node 106.

The service Tx 112A may include suitable logic, circuitry, and/or interfaces that may be configured to transmit a second beam of RF signals to one or more UEs 108A and 108B. In accordance with an embodiment, the service Tx 112A may refer to Tx that may provide communication services to end users. In accordance with an embodiment, the service Tx 112A may be a transmitter phased array. In accordance with an embodiment, the TX phased array may include a transmitter chain comprising a first set of power dividers, a first set of transmitter front end phase shifters, a first set of power amplifiers (PA), and a second antenna array. The first set of PAs may be configured to adjust an amplification gain of each of the plurality of RF signals on which phase shift has been performed by the first set of transmitter front end phase shifters. The service Rx 112B may be similar to the donor Rx 110A, but may be configured to receive one or more beams of RF signals from the one or more UEs 108A and 108B in uplink communication.

In operation, the donor Rx 110A of the communication device 102 may be configured receive a first beam of input RF signals from the base station 104 or the network node 106. The service Tx 112A may be configured to transmit a second beam of RF signals in a first radiation pattern to one or more UEs 108A and 108B. For example, a pilot signal may be transmitted from a first location of the communication device 102 within a defined area (e.g. an area where an installation of the communication device 102 may be intended). In an example, the communication device 102 may be configured to receive the first beam of input RF signals and transmit the one or more beams of output RF signals in accordance with multiple-input multiple-output (MIMO) reception and transmission.

The communication device 102 may be configured to detect an amount and a direction of echo signals at the donor Rx 110A. The echo signals correspond to a reflected RF signals in an environment surrounding the communication device 102. The reflected RF signals may be previously transmitted RF signals by the service Tx 112A that may re-appear at the donor Rx 110A. In accordance with an embodiment, the communication device 102 may be further configured to determine an installation location for the communication device 102 from a plurality of candidate locations in a defined area, based on the amount and the direction of the echo signals at the donor Rx 110A detected at one or more different locations of the plurality of candidate locations. The communication device 102 may be configured to execute initial radio channel measurements and self-configuration of the communication device 102. For example, pre-configured system calibrations may be executed, or an initial adjustment of forward gain may be done. The forward gain is described in detail, for example, in FIG. 3.

In accordance with an embodiment, the communication device 102 may be further configured to continuously or periodically monitor a radio channel that comprises measurement of a frequency ripple of the radio channel and a transmitter signal strength indicator (TSSI). The communication device 102 may be further configured to detect a loop gain based on the measured frequency ripple of the radio channel and the measured transmitter signal strength indicator (TSSI). The loop gain detection based on frequency ripple and TSSI is described in detail, for example, in FIGS. 4A and 4B. The loop gain indicates a current system state of the communication device 102 that is at least one of a stable system state, a quasi-stable system state, or an unstable system state. The system states and their transitions are described in detail, for example, in FIG. 5.

The communication device 102 may be further configured to apply polarization to the second beam of RF signals transmitted to the one or more UEs 108A and 108B. The communication device 102 may be further configured to calibrate the polarization to minimize the echo signals at the donor Rx 110A. The polarization is described in detail, for example, in FIGS. 2 and 6. The communication device 102 may be further configured to generate a second radiation pattern for at least the second beam of RF signals transmitted to the one or more UEs 108A and 108B according to the amount and the direction of the echo signals in the environment detected at the donor Rx 110A. The generated second radiation pattern may be different from the first radiation pattern. The communication device 102 may be configured to control communication of at least the second beam of RF signals in the generated second radiation pattern via the service Tx 112A to the one or more UEs 108A and 108B based on the calibrated polarization. The communication of the second beam of RF signals in the generated second radiation pattern may significantly reduce the echo signals at the donor Rx 110A.

In accordance with an embodiment, the communication device 102 may be further configured to adjust a forward gain related to the service Tx 112A from a first level to a second level. The communication device 102 may be further configured to detect a change in the amount and the direction of echo signals from the environment at the donor Rx based on the adjusted forward gain. The communication device 102 may be further configured to re-calibrate the polarization in accordance to the detected change in the amount and the direction of echo signals to reduce the echo signals at the donor Rx 110A.

In accordance with an embodiment, the communication device 102 may be further configured to reduce the forward gain to lower the loop gain towards less than or equal to zero decibels (dB) based on the unstable system state. The current system state of the communication device 102 is restored to the quasi-stable system state from the unstable system state based on the reduction in the forward gain.

In accordance with an embodiment, the communication device 102 may be further configured to reduce the forward gain to lower the loop gain to less than zero decibels (dB) based on the quasi-stable system state of the communication device 102. The current system state of the communication device 102 is restored to the stable system state from the quasi-stable system state based on the reduction in the forward gain and an echo suppression operation at the communication device 102. The echo suppression operation comprises a change in a radiation pattern of one or more beams of RF signals transmitted from the service Tx 112A that includes the second beam of RF signals and re-calibration of the polarization to minimize the echo signals that are reflected back to the donor Rx 110A. The communication device 102 may achieve a target final Rx SNR (i.e. signal quality at one or more remote UEs 108A and 108B may be greater than a defined threshold SNR, for example, greater than or equal to about 22 dB) as a result of the echo suppression operation in the communication device 102.

In accordance with an embodiment, in the stable system state, the communication device 102 may be further configured to adjust the forward gain such that a radiation pattern (e.g. the second radiation pattern) of at least the second beam of RF signals is optimized for maximization of a coverage and minimization of the echo signals. In accordance with an embodiment, the communication device 102 may be further configured to adjust an angle between a vertical polarization and a horizontal polarization radiated from the service Tx 112A for the calibration of the polarization such that when the echo signals are received at the donor Rx 110A, the echo signals of opposite polarization cancel each other.

In accordance with an embodiment, the communication device 102 may be further configured to transmit the second beam of RF signals with a first power level in a first direction and a third beam of RF signals in a second direction with a second power level that is less than the first power level when the amount of the echo signals in the environment detected at the donor Rx 110A is higher at a prior transmission of the third beam of RF signals in the second direction with the first power level.

In accordance with an embodiment, alternatively, the first beam of input RF signals may be received from at least one of one or more remote UEs in a LOS region or an NLOS region by the service Rx 112B of the communication device 102, and further communicated to the base station 104 or the network node 106 by the donor Tx 110B. The NLOS transmission path may be between the base station 104 and the one or more remote UEs 108A and 108B.

Figure 2:
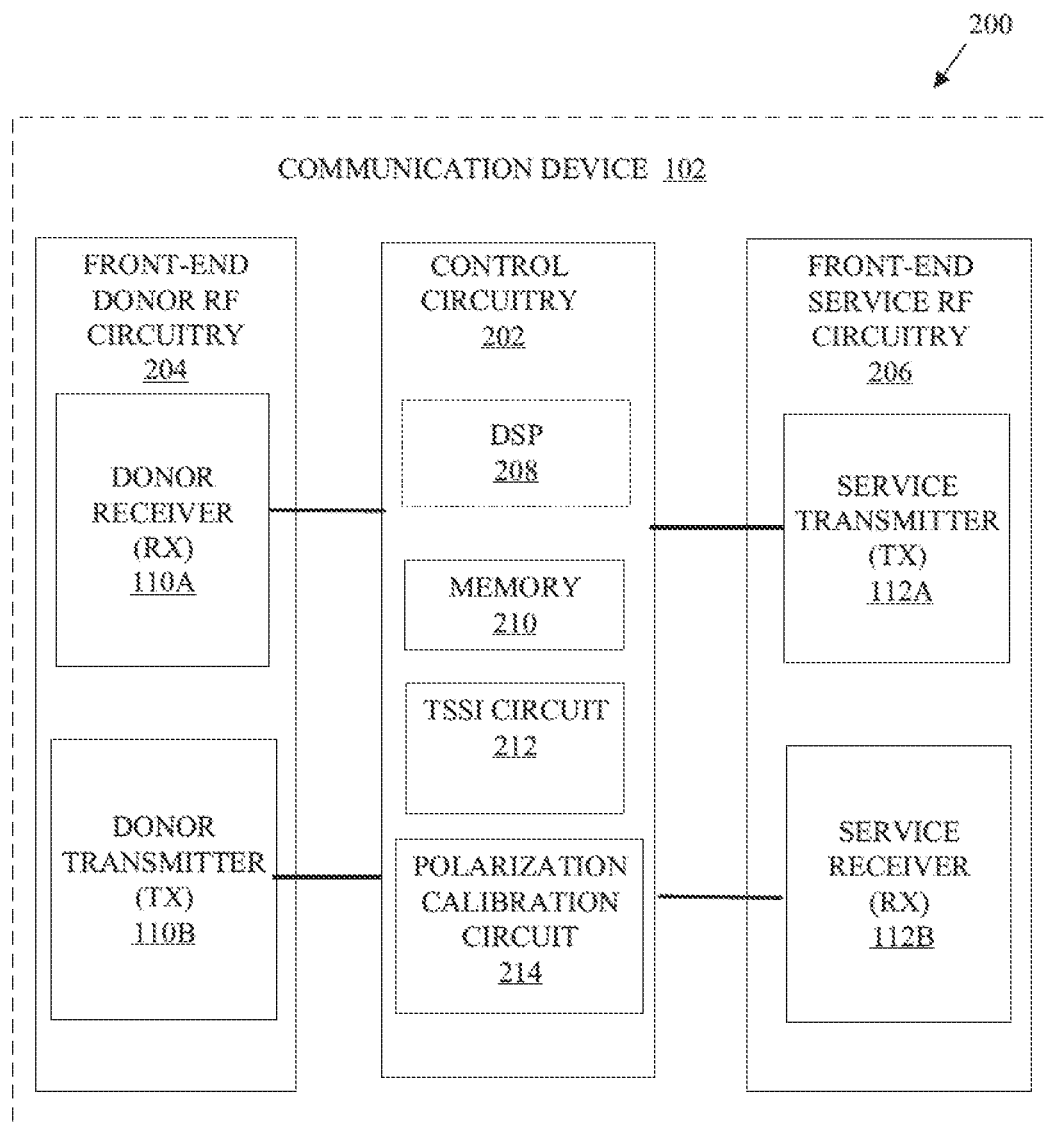
FIG. 2 is a block diagram illustrating various components of an exemplary communication device, in accordance with an exemplary embodiment of the disclosure.

FIG. 2 is a block diagram illustrating various components of an exemplary communication device, in accordance with an exemplary embodiment of the disclosure. FIG. 2 is explained in conjunction with elements from FIG. 1. With reference to FIG. 2, there is shown a block diagram 200 of the communication device 102. The communication device 102 may include control circuitry 202, a front-end donor RF circuitry 204, and a front-end service RF circuitry 206. In accordance with an embodiment, the control circuitry 202 may include a digital signal processor (DSP) 208, a memory 210, a TSSI circuit 212, and a polarization calibration circuit 214. In some embodiments, the communication device 102 may be implemented for analog processing of signals. In such embodiments, the DSP 208 may not be provided and the operations (or functions) of the DSP 208 may be implemented in a specialized circuitry to handle analog signals or may be handled by the control circuitry 202. In some embodiments, the control circuitry 202 itself may be a DSP. The front-end donor RF circuitry 204 includes the donor Rx 110A and the donor Tx 110B (described in FIG. 1). The front-end service RF circuitry 206 includes the service Rx 112A and the service Tx 112B (FIG. 1). The control circuitry 202 may be communicatively coupled to the front-end donor RF circuitry 204 and the front-end service RF circuitry 206.

The control circuitry 202 may be configured to control the front-end donor RF circuitry 204 and the front-end service RF circuitry 206. The communication device 102 may be a programmable device, where the DSP 208 may execute instructions stored in the memory 210. Example of the implementation of the DSP 208 may include, but are not limited to an embedded processor, a microcontroller, a specialized DSP, a Reduced Instruction Set Computing (RISC) processor, an Application-Specific Integrated Circuit (ASIC) processor, a Complex Instruction Set Computing (CISC) processor, and/or other processors.

The memory 210 may include suitable logic, circuitry, and/or interfaces that may be configured to store instructions executable by the DSP 206. The memory 210 may be further configured to store values of measured TSSI and the frequency ripple (e.g. a radio channel ripple). Examples of implementation of the memory 210 may include, but are not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The TSSI circuit 212 may include suitable logic and/or interfaces that may be configured to execute TSSI measurements in a transmitter chain (e.g. across power amplifiers in the transmitter chain) in a phased Tx antenna array, such as the service Tx 112A. In accordance with an embodiment, TSSI measurements may be performed by coupling onto the output of last stage power amplifiers (not shown) in the transmitter chain, such as the service Tx 112A. TSSI is primarily used to calibrate absolute Tx power levels and facilitate transmit power control (TPC) flows. TSSI may be measured in analog domain and/or in digital domain depending on the type of implementation. In accordance with an embodiment, in addition to TSSI, RSSI measurements may also be executed to improve various aspects of both uplink/downlink connections. RSSI measurements may be utilized to configure the optimal gain distribution within a receiver chain (e.g. the donor Rx 110A or the service Rx 112B) or may be used as part of the transmit power control flow to adjust the transmit power of a transmitter chain (e.g., the service Tx 112A).

The polarization calibration circuit 214 of the control circuitry 202 may include suitable logic and/or interfaces that may be configured to calibrate the polarization applied to one or more beams of RF signals radiated to the one or more UEs 108A and 108B. The polarization is calibrated to minimize the echo signals at the donor Rx 110A. The polarization calibration circuit 214 may be configured to re-calibrate the polarization in accordance with a detected change in the amount and the direction of echo signals to further reduce the echo signals at the donor Rx 110A. In accordance with an embodiment, the control circuitry 202 may be configured to adjust an angle between a vertical polarization and a horizontal polarization radiated from the service Tx 112A using the polarization calibration circuit 214 for the calibration of the polarization such that when the echo signals are received at the donor Rx 110A, the echo signals of opposite polarization cancel each other.

Figure 3:
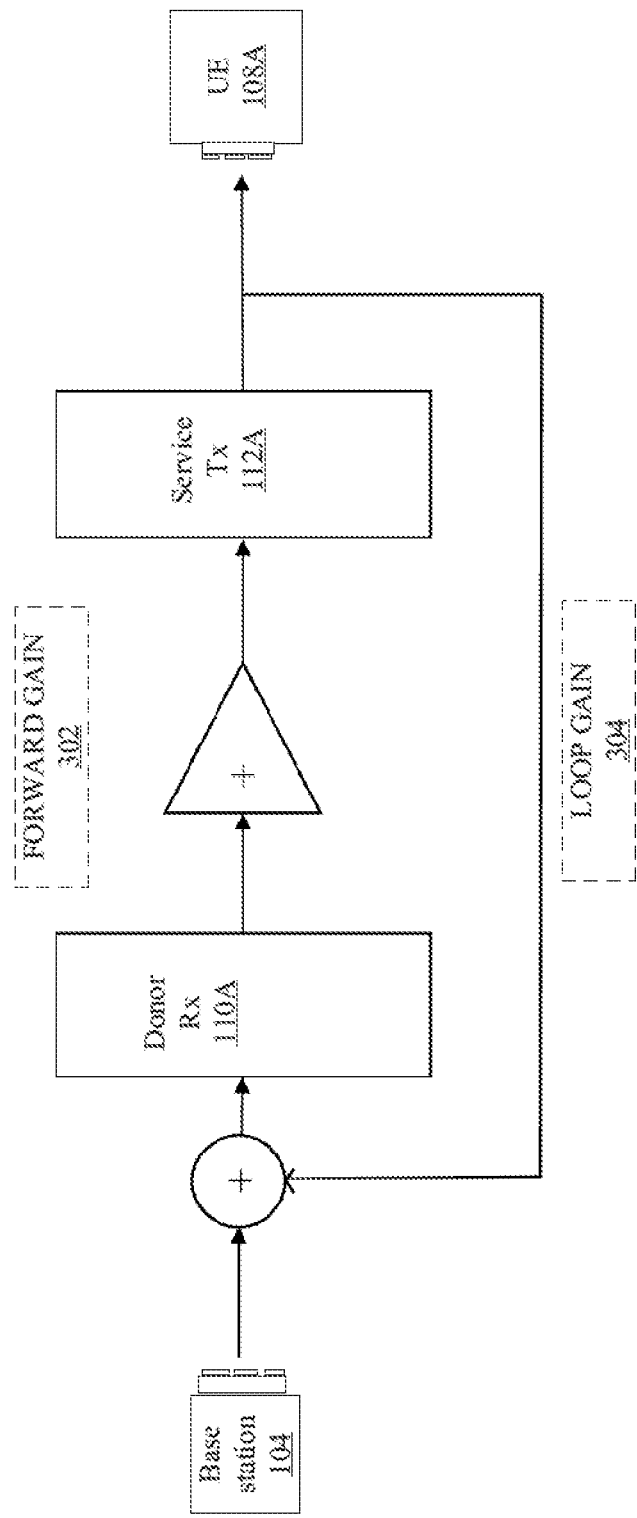
FIG. 3 illustrates an exemplary communication device with a forward gain and a loop gain, in accordance with an exemplary embodiment of the disclosure.

FIG. 3 illustrates an exemplary communication device with a forward gain and a loop gain, in accordance with an exemplary embodiment of the disclosure. FIG. 3 is explained in conjunction with elements from FIGS. 1 and 2. With reference to FIG. 3, there is shown a forward gain 302, a loop gain 304, the base station 104 (e.g. a gNB), the donor Rx 110A and the service Tx 112A of the communication device 102, and the UE 108A (FIG. 1).

Typically, gain is a measure of the ability of a two-port circuit (e.g. a power amplifier) to increase the power (or in some cases amplitude) of a signal from the input to the output port by adding energy converted from some power supply to the signal. The control circuitry 202 may be configured to adjust the forward gain 302 related to the signal received from the base station 104 (e.g. a gNB) from a first level at the donor Rx 110A to a second level at the service Tx 112A. The forward gain 302 typically refers to the ratio of signal transmitted in maximum direction to the signal in reference or standard antenna direction. In certain scenarios, the service Tx 112A may transmit a defined amount of power in one direction, and less power in another direction(s). Thus, in a case where the service Tx 112A may transmit more power in one direction, then it may be realized that a portion of the service Tx 112A (which may transmit the RF signal received from the base station 104 to the UE 108A) has the forward gain 302. The forward gain 302 may be measured in terms of decibels (dB).

In accordance with an embodiment, the control circuitry 202 may be further configured to detect a change in the amount and the direction of echo signals from the environment at the donor Rx 110A based on the adjusted forward gain. For example, the service Tx 112A may concurrently transmit two pilot beams of RF signals in a first direction and a second direction towards the one or more UEs 108A and 108B. The control circuitry 202 may be configured to detect an amount and a direction of echo signals at the donor Rx 110A when the service Tx 112A concurrently transmits two pilot beams of RF signals in the first direction and the second direction. For example, the control circuitry 202 may be configured to detect that more echo signals are received at the donor Rx 110A when a first pilot beam of RF signals of the two pilot beams is transmitted in the first direction. Further, the control circuitry 202 may be configured to sense the amount of power and the direction of power radiated (e.g. in the first and the second direction). Thus, the control circuitry may be configured to change the radiation pattern of the two pilot beams, and accordingly the first pilot beam of RF signals is shaped and transmitted in a narrow beam or a short beam with less power as compared to a second pilot beam of RF signals of the two pilot beams that is transmitted with comparatively higher amount of power (using the forward gain 302) with a different radiation pattern (e.g. a broad beam or a long range narrow beam). This real-time or near real time change in the radiation pattern may reduce the amount of echo signals at the donor Rx 110A, which in turn increases a signal to noise ratio (SNR) for the signals received by the one or more UEs 108A and 108B.

In accordance with an embodiment, the system stability, i.e., the stability of the communication device 102 may be determined by the loop gain 304. The loop gain 304 typically refers to a sum of the gain around a feedback loop and is typically expressed as a ratio or in decibels (dB). A target loop gain 304 to be achieved may be a function of a loop latency known in the art. In accordance with an embodiment, the control circuitry 202 may be configured to reduce the forward gain 302 to lower the loop gain 304 towards less than or equal to zero decibels (dB). The forward gain 302 may be reduced when an unstable system state is detected (i.e. when large frequency ripples (i.e. channel ripples or fluctuations) and oscillation is detected by the control circuitry 202).

Figure 4A:
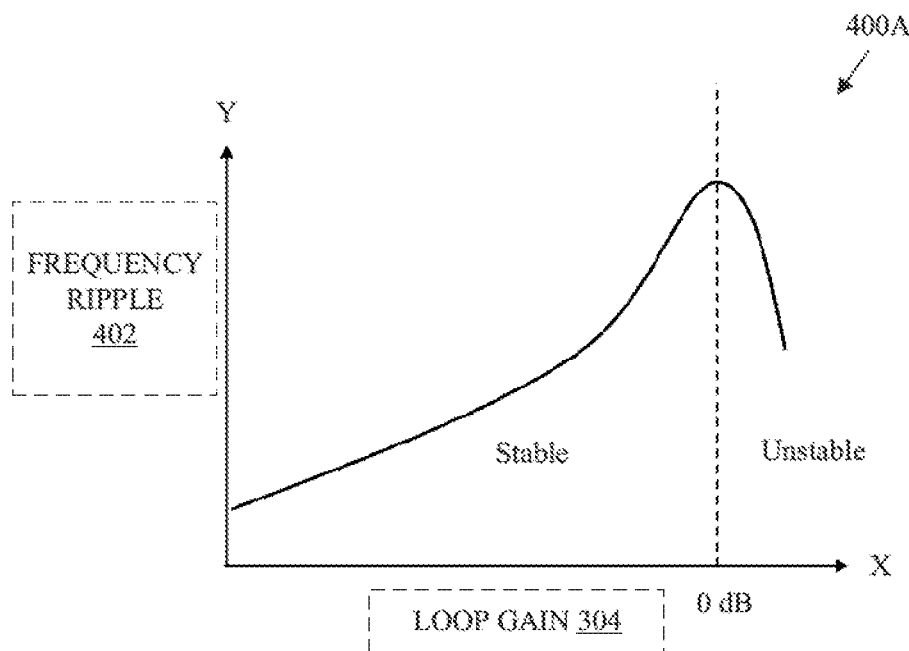
FIG. 4A illustrates a graphical representation of loop gain detection based on frequency ripple in an exemplary communication device, in accordance with an exemplary embodiment of the disclosure.

FIG. 4A illustrates a graphical representation of loop gain detection based on frequency ripple in an exemplary communication device, in accordance with an exemplary embodiment of the disclosure. FIG. 4A is explained in conjunction with elements from FIGS. 1, 2, and 3. With reference to FIG. 4A, there is shown a graphical representation 400A. The graphical representation 400A depicts an increase in the loop gain 304 along the X-axis and a proportionate increase in a frequency ripple 402 in decibels (dB peak-to-peak) detected by the communication device 102 (of FIG. 1). In this case, a current system state of the communication device 102 may change or transition from a stable system state to an unstable system state after a certain amount of the frequency ripple 402 (denoted by a peak) in a radio channel (i.e. an established communication channel between the base station 104 and a UE (such as the UE 108A) via the communication device 102). The amount of the frequency ripple 402 (denoted by a peak) in a radio channel may be used for detection of a current loop gain 304 (e.g. in this case, the stable system state switches to the unstable system state after zero dB of the loop gain 304 (as indicated by vertical dashed lines in the graphical representation 400A).

Figure 4B:
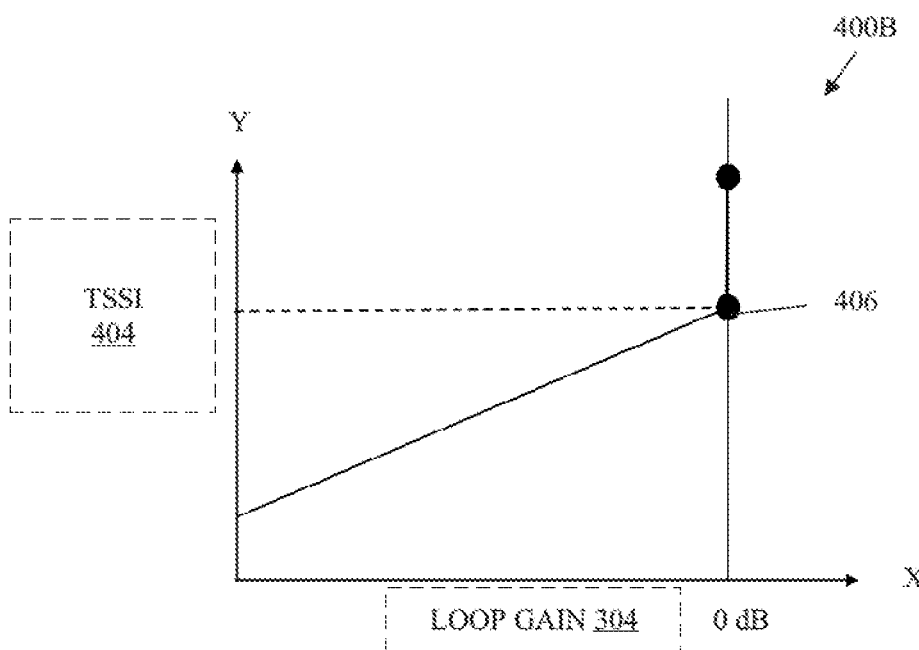
FIG. 4B illustrates a graphical representation of loop gain detection based on transmitter signal strength indicator (TSSI) in an exemplary communication device, in accordance with an exemplary embodiment of the disclosure.

FIG. 4B illustrates a graphical representation of loop gain detection based on transmitter signal strength indicator (TSSI) in an exemplary communication device, in accordance with an exemplary embodiment of the disclosure. FIG. 4B is explained in conjunction with elements from FIGS. 1, 2, 3, and 4A. With reference to FIG. 4B, there is shown a graphical representation 400B. The graphical representation 400B depicts an increase in the loop gain 304 along the X-axis and a proportionate increase in a TSSI 404 in decibels-milliwatt (dBm) detected by the communication device 102 (of FIG. 1). dBm is typically a unit of level used to indicate that a power ratio is expressed in decibels (dB) with reference to one milliwatt (mW). In this case, a current system state of the communication device 102 may turn from a stable system state to an unstable system state after a certain threshold 406 (denoted by a horizontal dashed line) of the measured TSSI 404 in the radio channel. The threshold 406 may be used for detection of a maximum loop gain 304 to retain system stability or the stable system state (e.g. in this case, the stable system state may switch to the unstable system state after zero dB of the loop gain 304). With reference to FIGS. 4A and 4B, the control circuitry 202 may be configured to monitor the radio channel that comprises measurement of the frequency ripple 402 of the radio channel and the TSSI 404. The control circuitry 202 may then detect the loop gain 304 based on the measured frequency ripple 402 of the radio channel and the measured TSSI 404, as discussed, for example, in the FIGS. 4A and 4B.

Figure 5:
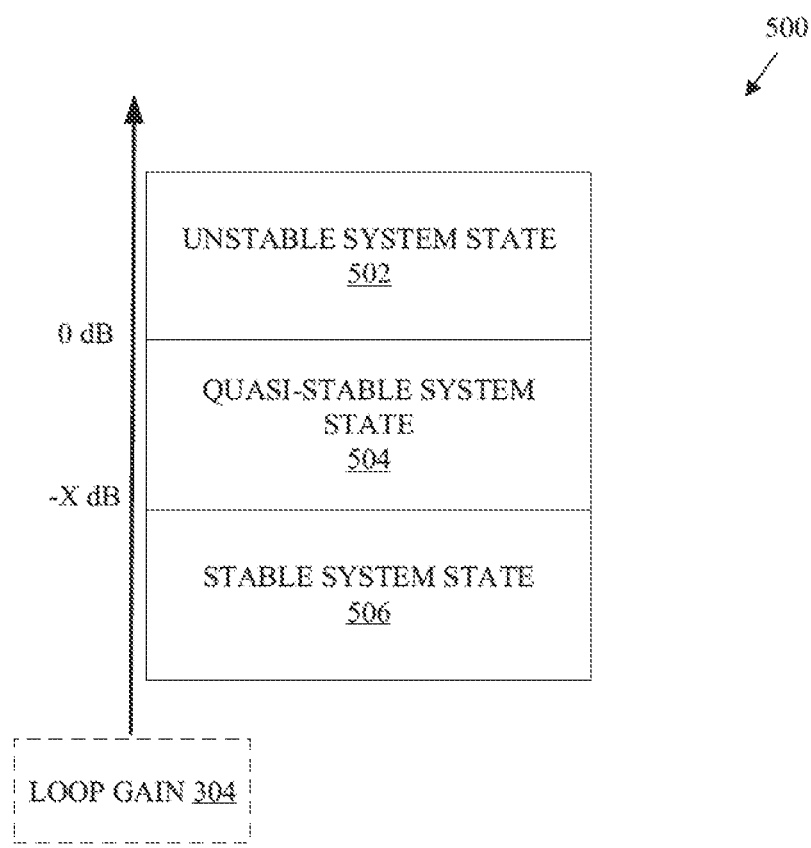
FIG. 5 illustrates a relationship between system stability and loop gain in an exemplary communication device, in accordance with an exemplary embodiment of the disclosure.

FIG. 5 illustrates a relationship between system stability and loop gain in an exemplary communication device, in accordance with an exemplary embodiment of the disclosure. FIG. 5 is explained in conjunction with elements from FIGS. 1, 2, 3, 4A, and 4B. With reference to FIG. 5, there is shown a graphical representation 500. The graphical representation 500 depicts a transition of a current system state from an unstable system state 502 to a quasi-stable system state 504, and further to a stable system state 506.

The unstable system state 502 is determined when large frequency ripples (e.g. the frequency ripple 402 from peak-to-peak) and oscillation are detected from RF signals received at the donor Rx 110A. In accordance with an embodiment, the control circuitry 202 may be further configured to reduce the forward gain 302 to lower the loop gain 304 towards less than or equal to zero decibels (dB) when the unstable system state 502 is detected. The current system state of the communication device 102 may transition to the quasi-stable system state 504 from the unstable system state 502 based on the reduction in the forward gain 302.

In the quasi-stable system state 504 of the communication device 102, the control circuitry 202 may be configured to further reduce the forward gain 302 to lower the loop gain 304 to less than zero decibels (dB). In other words, in the quasi-stable system state 504, the control circuitry 202 may continue to reduce the forward gain 302 to reduce the frequency ripples (or channel ripples) in the radio channel. In some cases, the effective isotropic radiated power (EIRP) or coverage may be temporality (or momentarily) reduced (or compromised) from service Tx 112A when there is a reduction in the forward gain 302 in order to manage the system stability. The current system state of the communication device 102 is restored to the stable system state 506 from the quasi-stable system state 504 based on the reduction in the forward gain 302 (e.g. to −X dB i.e. for example, −7 to −11 dB) and an echo suppression operation at the communication device 102. The echo suppression operation comprises a change in the radiation pattern of one or more beams of RF signals transmitted from the service Tx 112A and re-calibration of the polarization using the polarization calibration circuit 214 to minimize the echo signals that are reflected back to the donor Rx 110A. In accordance with an embodiment, in the stable system state 506, the control circuitry 202 may then adjust the forward gain 302 such that the radiation pattern of at least one beam of RF signals radiated from the service Tx 112A is optimized for maximization of a coverage and minimization of the echo signals.

Figure 6:
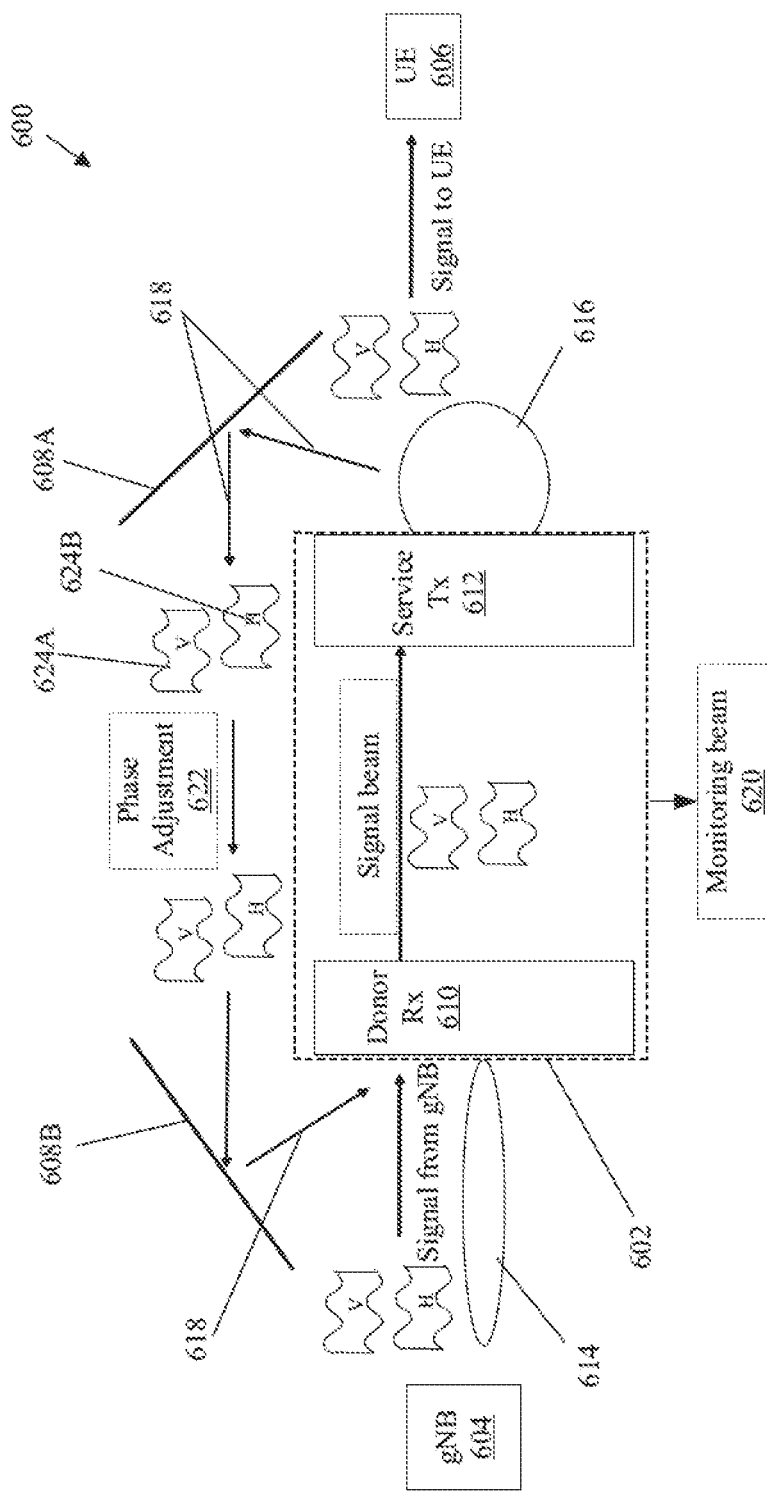
FIG. 6 illustrates an exemplary scenario for implementation of the communication device for echo signals management, in accordance with an embodiment of the disclosure.

FIG. 6 illustrates an exemplary scenario for implementation of the communication device for echo signals management, in accordance with an embodiment of the disclosure. FIG. 6 is explained in conjunction with elements from FIGS. 1, 2, 3, 4A, 4B, and 5. With reference to FIG. 6, there is shown an exemplary scenario 600 that includes a repeater device 602, a gNB 604, a UE 606, and reflectors 608A and 608B. The repeater device 602 may include a donor Rx 610 and a service Tx 612.

In operation, the donor Rx 610 of the repeater device 602 may be configured receive a first beam of input RF signals 614 from the gNB 604. The service Tx 612 may be configured to transmit a second beam of RF signals 616 to the UE 606. The repeater device 602 may be configured to detect an amount and a direction of echo signals at the donor Rx 610. The echo signals correspond to reflected RF signals 618 in an environment surrounding the repeater device 602. The reflected RF signals 618 are RF signals previously transmitted by the service Tx 612, which re-appears at the donor Rx 610. The echo signals may be reflected from reflective surfaces, such as the reflective surfaces of the reflectors 608A and 608B present in the environment. In accordance with an embodiment, the repeater device 602 may be configured to transmit a monitoring signal 620 from the installation place of the repeater device 602 for initial channel measurements including TSSI and frequency ripple measurements. The monitoring signal may be devoid of actual data signals received from the gNB 604.

In conventional systems, when a signal is boosted, the signal is usually received and transmitted at a same frequency and mostly without any processing in digital domain in real time. This kind of concept may not work in low frequency as the signals may bounce back to a conventional receiver at the lower frequency. The signals may oscillate in the form of echo comeback (i.e. echo signals). This creates a large amount of intersymbol interference (ISI). The intersymbol interference may degrade the performance of a conventional communication device (e.g. a repeater device). Typically, signal boosting is also sensitive to location where the signal boosting is applied, the reflective surfaces, such as the reflectors 608A and 608B, present in the environment, and the amount of boosting required. However, in mmWave frequency, and as one or more phased array antenna is used, thus, there are different antennas for receiving and transmitting of beams of RF signals.

The disclosed communication device 102 (or the repeater device 602) receives the first beam of input RF signals 614 at the donor Rx 610 (one antenna array) and transmits the second beam of RF signals 616 from the service Tx 612 (i.e. another antenna array). In an example, a narrow beam may be received at the donor Rx 610 from the gNB 604 at one side of the repeater device 602 and a narrow or a wide beam may be transmitted at the other side, i.e., from the service Tx 612. In other words, any desired radiation pattern may be generated by the service Tx 612. In case of the mmWave communication, the donor Rx 610 and the service Tx 612 may be two different antenna arrays and may have no correlation. For example, two signals (e.g. x+y signal) may be received by the donor Rx 610, but only one signal (e.g. y signal without x) may be transmitted by the service Tx 612. Thus, during transmission, different correlation may be generated, and polarization of the transmitted signals (RF signals) may be controlled. Beneficially, since there is full control on every path of RF signal that goes to the repeater device 602 (i.e. antenna arrays), as a result of the known installation location of the repeater device 602, the donor Rx 610 and the service Tx 612 have full control on amplitude and phase of the RF signals that are transmitted in space for the UE 606. Further, the repeater device 602 have two check paths, one for vertical polarization control and the other for horizontal polarization control, which is independent of amplitude control and phase control. The service Tx 612 may be configured to perform V+H polarization phase optimization by application of a phase adjustment 622 to restore the forward gain 302 as if there are no large reflectors 608A and 608B. The repeater device 602 may be further configured to adjust an angle between a vertical polarization 624A and a horizontal polarization 624B radiated from the service Tx 612 for the calibration of the polarization such that before the echo signals are received at the donor Rx 610, the echo signals of opposite polarization cancel each other. The control circuitry 202 of the repeater device 602 may be configured to continuously or periodically change the angle for polarization and adjust so that when the RF signals bounce back from the reflectors 608A and 608B, they cancel each other. Alternatively stated, the repeater device 602 may be further configured to apply polarization to the second beam of RF signals 616 transmitted to the UE 606 and further calibrate the polarization such that the echo signals at the donor Rx 610 are minimized. Further, based on the amount and the direction of the echo signals in the environment detected at the donor Rx 610, the repeater device 602 may be further configured to generate a radiation pattern for at least the second beam of RF signals 616 transmitted to the UE 606. For example, if no echo signals are detected at the donor Rx 610, a wide beam pattern may be generated. On the other hand, if a large amount of echo signals is detected from one direction, a minimum power is transmitted in that direction, while more power is transmitted in other direction(s), and the beam pattern of transmitted RF signals may be changed accordingly.

In accordance with an embodiment, the repeater device 602 may be further configured to detect a change in the amount and the direction of echo signals from the environment at the donor Rx 610. The repeater device 602 may be further configured to re-calibrate the polarization in accordance to the detected change in the amount and the direction of echo signals to reduce the echo signals at the donor Rx 610. The repeater device 602 may be further configured to execute an echo suppression operation, which comprises a combination of a change in the radiation pattern of the second beam of RF signals 616 transmitted from the service Tx 612 and re-calibration of the polarization to minimize the echo signals that are reflected back to the donor Rx 610. The current system state of the repeater device 602 is restored to the stable system state 506 from the quasi-stable system state 504 based on the reduction in the forward gain 302 and the echo suppression operation at the repeater device 602. In the stable system state, the repeater device 602 may be further configured to adjust the forward gain 302 such that the radiation pattern of the second beam of RF signals 616 is optimized for maximization of the EIRP and coverage and minimization of the echo signals.

Figure 7A:
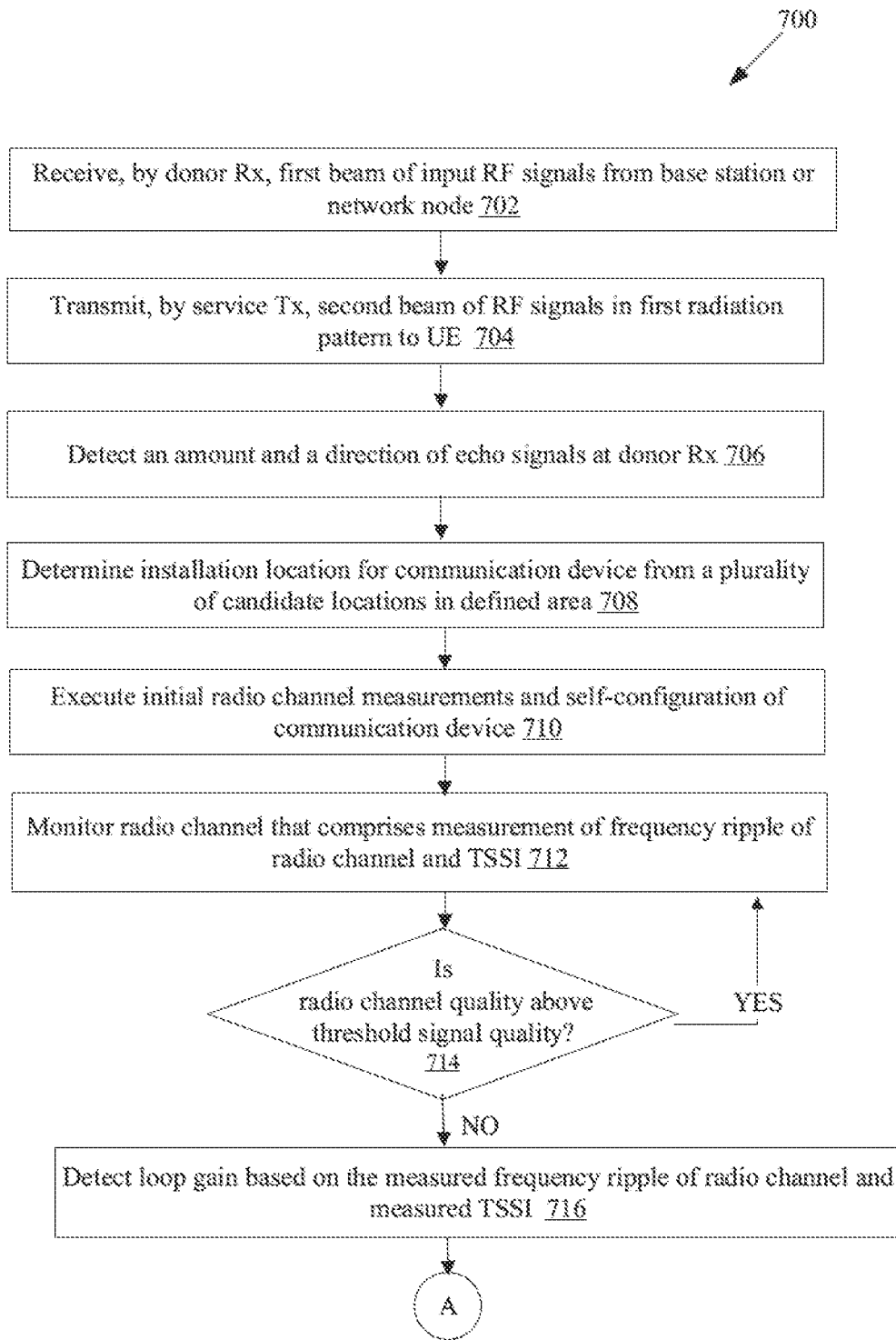
FIGS. 7A and 7B, collectively, depict a flow chart that illustrates exemplary operations for echo signals management, in accordance with an embodiment of the disclosure.
Figure 7B:
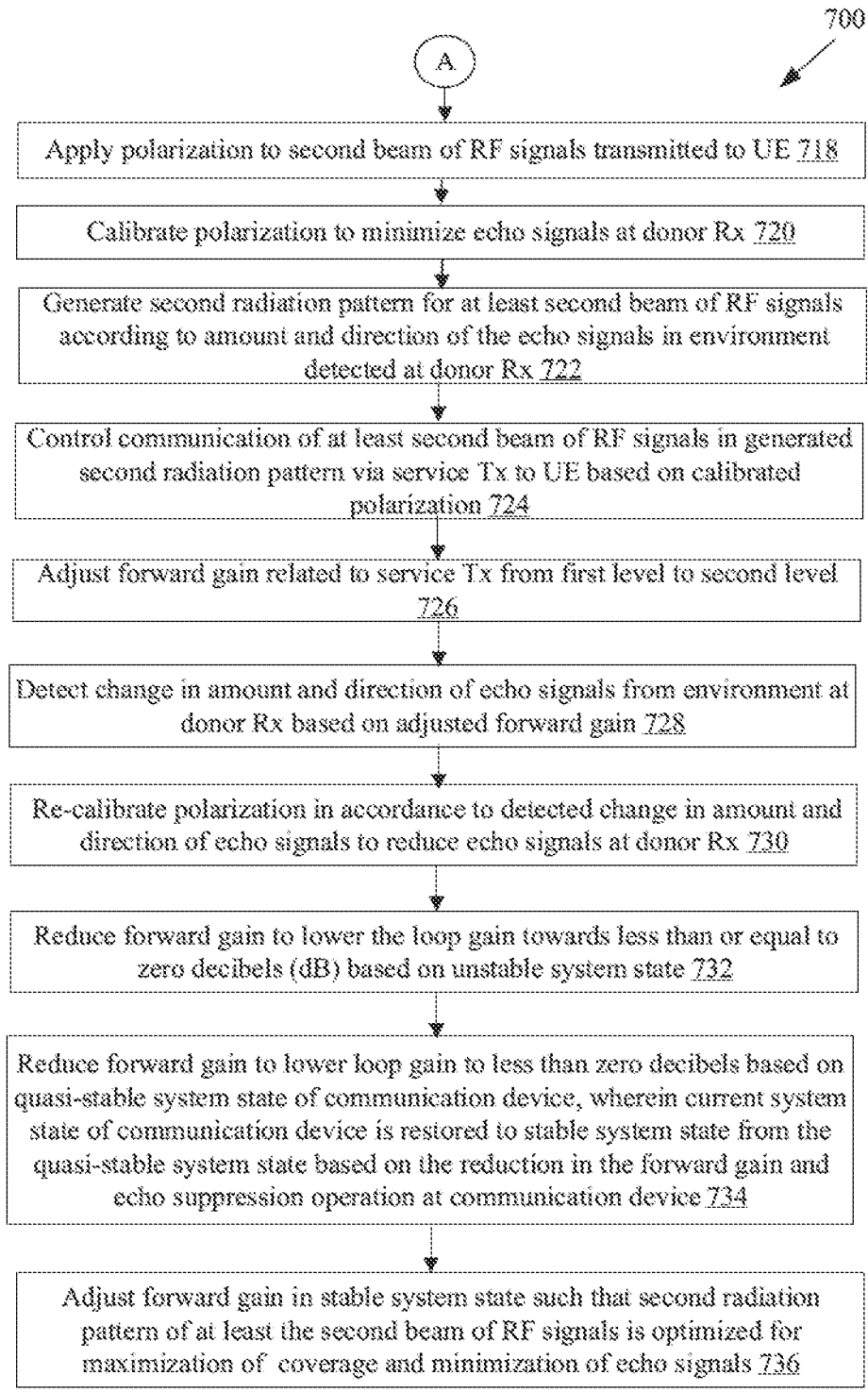

FIGS. 7A and 7B, collectively, depict a flow chart that illustrates exemplary operations for echo signals management, in accordance with an embodiment of the disclosure. With reference to FIGS. 7A and 7B, there is shown a flowchart 700 that includes exemplary operations from 702 to 734.

At 702, a first beam of input RF signals may be received by the donor Rx 110A from a base station or a network node. The donor Rx 110A may be configured to receive the first beam of input RF signals.

At 704, a second beam of RF signals may be transmitted by the service Tx 112A in a first radiation pattern to a UE (e.g. the UE 108A, 108B, or 606). The service Tx 112A may be configured to transmit the second beam of RF signals, for example, a pilot signal or a monitoring signal in a first radiation pattern (e.g. a broad beam) from a first location within a defined area (e.g. a site where an installation of the communication device 102 may be intended).

At 706, an amount and a direction of echo signals at the donor Rx 110A may be detected. The echo signal may correspond to reflected RF signals in an environment surrounding the communication device 102. The reflected RF signals may be RF signals previously transmitted by the service Tx 112A, which may re-appear at the donor Rx 110A. Alternatively stated, the control circuitry 202 may be configured to detect the amount and the direction of echo signals that may provide an indication of the signal quality at the site based on the statistics of reflection (e.g. the amount and the direction of echo signals).

At 708, an installation location for the communication device 102 may be determined from a plurality of candidate locations in the defined area. The installation location may be detected based on the amount and the direction of the echo signals at the donor Rx 110A detected at one or more different locations of the plurality of candidate locations.

At 710, an initial radio channel measurements and self-configuration of the communication device 102 may be executed. The control circuitry 202 may be configured to execute initial radio channel measurements and self-configuration of the communication device 102. For example, RSSI, TSSI, and other measurements, such as echo signals and frequency ripple measurements, may be executed. In accordance with an embodiment, the control circuitry 202 may be configured to measure a signal quality (e.g., in terms of SNR or EVM SNR) of the received first beam of input RF signals at the donor Rx 110A. As an example, an Orthogonal Frequency-Division Multiplexing (OFDM) signal, i.e. a digital signal received at the donor Rx 110A may have a SNR of "40 dB" with respect to an input SNR for OFDM signals at the service Tx 112A side of the communication device 102. The SNR of "40 dB" further indicates an absence of an effect on the SNR by the echo signal that is usually received by the donor Rx 110A. In terms of an error vector magnitude (EVM), the SNR of the OFDM signal may be represented by "−40 dB EVM". In presence of the echo signal at the receiver side (i.e. the donor Rx 110A), the SNR of the OFDM signals at the donor Rx 110A may drop down to a lower SNR, such as less than or equal to "19.5 dB" or "−19.5 dB EVM". In accordance with an embodiment, the control circuitry 202 may be configured to run pre-configured system calibrations and initially adjust forward gain 302 and/or establish the radio channel link.

At 712, a radio channel that comprises measurement of a frequency ripple of the radio channel and a transmitter signal strength indicator (TSSI), may be monitored. The control circuitry 202 may be configured to continuously or periodically monitor the radio channel (i.e. the established communication channel in downlink/uplink).

At 714, it may be determined whether the radio channel quality is above the threshold signal quality. In cases where the radio channel quality is above the threshold signal quality (e.g. greater than or equal to about 22 dB), the control moves back to 712 or else to 716.

At 716, a loop gain may be detected based on the measured frequency ripple of the radio channel and the measured TSSI. The loop gain indicates a current system state of the communication device that is the stable system state 506, the quasi-stable system state 504, or the unstable system state 502.

At 718, polarization may be applied to the second beam of RF signals transmitted to the UE (e.g. the UE 108A). The control circuitry 202 may be configured to apply polarization to the second beam of RF signals. At 720, the polarization may be calibrated to minimize the echo signals at the donor Rx 110A. The control circuitry 202 may be configured to calibrate the polarization to minimize the echo signals at the donor Rx 110A.

At 722, a second radiation pattern may be generated for at least the second beam of RF signals according to the amount and the direction of the echo signals in the environment detected at the donor Rx 110A. The control circuitry 202 may be further configured to generate the second radiation pattern (e.g. a less broad beam than previously transmitted second beam of RF signals in the first radiation pattern). The generated second radiation pattern may be different from the first radiation pattern. At 724, communication of at least the second beam of RF signals in the generated second radiation pattern may be controlled via the service Tx 112A to the UE (e.g. the UE 108A, 108B, or 606) based on the calibrated polarization. The communication of at least the second beam of RF signals in the generated second radiation pattern may further reduce the echo signals at the donor Rx 110A. Beneficially, the control circuitry 202 of the communication device 102 effectively suppresses the echo signals even in a highly reflective environment using a combination of the calibrated polarization and a change in radiation pattern of the transmitted signal (e.g. the second beam of RF signals in the generated second radiation pattern) for maximization of the signal coverage and minimization of the echo signals.

At 726, a forward gain may be adjusted related to the service Tx 112A from a first level to a second level. At 728, a change in the amount and the direction of echo signals from the environment may be detected at the donor Rx 110A based on the adjusted forward gain. At 730, the polarization may be re-calibrated in accordance to the detected change in the amount and the direction of echo signals to reduce the echo signals at the donor Rx 110A.

At 732, the forward gain 302 may be reduced to lower the loop gain 304 towards less than or equal to zero decibels (dB) based on the unstable system state 502. The current system state of the communication device 102 is restored to the quasi-stable system state 504 from the unstable system state 502 based on the reduction in the forward gain 302. At 734, the forward gain may be further reduced to lower the loop gain to less than zero decibels (dB) based on the quasi-stable system state 504 of the communication device 102. The current system state of the communication device 102 is restored to the stable system state 506 from the quasi-stable system state 504 based on the reduction in the forward gain 302 and the echo suppression operation at the communication device 102. The echo suppression operation comprises a change in a radiation pattern of one or more beams of RF signals transmitted from the service Tx 112A that includes the second beam of RF signals and re-calibration of the polarization to minimize the echo signals that are reflected back to the donor Rx 110A.

At 736, the forward gain may be adjusted in the stable system state 506 such that the second radiation pattern of at least the second beam of RF signals is optimized for maximization of a coverage and minimization of the echo signals. Further, an angle between a vertical polarization and a horizontal polarization radiated from the service Tx 112A may be adjusted for the calibration of the polarization such that when the echo signals are received at the donor Rx 110A, the echo signals of opposite polarization cancel each other.

Various embodiments of the disclosure may provide a system for echo signals management. The system may include the communication device 102 (FIG. 1) that comprises the donor Rx 110A (FIG. 1) configured receive a first beam of input RF signals from the base station 104 or the network node 106. The communication device 102 further includes the service Tx 112A (FIG. 1) configured to transmit a second beam of RF signals in a first radiation pattern to the UE (e.g. 108A, 108B, or 606). The communication device 102 further includes control circuitry 202 (FIG. 2), which is configured to detect an amount and a direction of echo signals at the donor Rx 110A. The echo signals correspond to reflected RF signals in an environment surrounding the communication device 102. The control circuitry 202 may be further configured to apply polarization to the second beam of RF signals transmitted to the UE (e.g. 108A, 108B, or 606). The control circuitry 202 may be further configured to calibrate the polarization to minimize the echo signals at the donor Rx 110A. The control circuitry 202 may be further configured to generate a second radiation pattern for at least the second beam of RF signals according to the amount and the direction of the echo signals in the environment detected at the donor Rx 110A. The control circuitry 202 may be further configured to control communication of the at least the second beam of RF signals in the generated second radiation pattern via the service Tx 112A (FIG. 1) to the UE (e.g. 108A, 108B, or 606) based on the calibrated polarization. The communication of the at least the second beam of RF signals in the generated second radiation pattern significantly reduces the echo signals at the donor Rx 110A.

In accordance with an embodiment, the control circuitry 202 may be further configured to determine an installation location for the communication device 102 from a plurality of candidate locations in a defined area, based on the amount and the direction of the echo signals at the donor Rx 110A detected at one or more different locations of the plurality of candidate locations. The control circuitry 202 may be further configured to monitor a radio channel that comprises measurement of a frequency ripple of the radio channel and a transmitter signal strength indicator (TSSI).

In accordance with an embodiment, the control circuitry 202 may be further configured to detect the loop gain 304 based on the measured frequency ripple of the radio channel and the measured transmitter signal strength indicator (TSSI). The loop gain 304 indicates a current system state of the communication device 102 that is at least one of the stable system state 506, the quasi-stable system state 504, or the unstable system state 502.

In accordance with an embodiment, the control circuitry 202 may be further configured to adjust the forward gain 302 related to the service Tx 112A from a first level to a second level. The control circuitry 202 may be further configured to detect a change in the amount and the direction of echo signals from the environment at the donor Rx based on the adjusted forward gain. The control circuitry 202 may be further configured to re-calibrate the polarization in accordance to the detected change in the amount and the direction of echo signals to reduce the echo signals at the donor Rx 110A.

In accordance with an embodiment, the control circuitry 202 may be further configured to reduce the forward gain 302 to lower the loop gain 304 towards less than or equal to zero decibels (dB) based on the unstable system state. The current system state of the control circuitry 202 is restored to the quasi-stable system state 504 from the unstable system state 502 based on the reduction in the forward gain 302.

In accordance with an embodiment, the control circuitry 202 may be further configured to reduce the forward gain 302 to lower the loop gain 304 to less than zero decibels (dB) based on the quasi-stable system state 504 of the communication device 102. The current system state of the communication device is restored to the stable system state 506 from the quasi-stable system state 504 based on the reduction in the forward gain 302 and an echo suppression operation at the communication device 102. The echo suppression operation comprises a change in a radiation pattern of one or more beams of RF signals transmitted from the service Tx 112A that includes the second beam of RF signals and re-calibration of the polarization to minimize the echo signals that are reflected back to the donor Rx 110A.

In accordance with an embodiment, in the stable system state, the control circuitry 202 may be further configured to adjust the forward gain 302 such that the second radiation pattern of at least the second beam of RF signals is optimized for maximization of a coverage and minimization of the echo signals. In accordance with an embodiment, the control circuitry 202 may be further configured to adjust an angle between a vertical polarization 124A and a horizontal polarization 124B radiated from the service Tx 112A for the calibration of the polarization such that when the echo signals are received at the donor Rx 110A, the echo signals of opposite polarization cancel each other.

In accordance with an embodiment, the control circuitry 202 may be further configured to transmit the second beam of RF signals with a first power level in a first direction and a third beam of RF signals in a second direction with a second power level that is less than the first power level when the amount of the echo signals in the environment detected at the donor Rx 110A is higher at a prior transmission of the third beam of RF signals in the second direction with the first power level.

Various embodiments of the disclosure may provide a non-transitory computer-readable medium having stored thereon, computer implemented instruction that when executed by one or more circuits causes a device to execute operations similar to the operations disclosed herein for the system for echo signals management.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:
1. A communication device, comprising:
 a donor receiver (Rx) configured to receive a first beam of input radio frequency (RF) signals from a base station or a network node;

a service transmitter (Tx) configured to transmit a second beam of RF signals in a first radiation pattern to a user equipment (UE);

a control circuitry configured to:
- detect an amount and a direction of echo signals at the donor Rx corresponding to reflected RF signals in an environment surrounding the communication device;
- determine an installation location for the communication device based on echo signal measurements at one or more different locations;
- adjust polarization of the second beam of RF signals to minimize the echo signals at the donor Rx; and
- generate a second radiation pattern for at least the second beam of RF signals based on the amount and the direction of the echo signals in the environment detected at the donor Rx.

2. The communication device of claim 1, further comprising a plurality of microphones located at different positions within the communication device for detecting the amount and the direction of the echo signals.

3. The communication device of claim 1, wherein the communication device is at least one of a repeater device, a RF signal booster device, an Evolved-universal terrestrial radio access-New radio Dual Connectivity (EN-DC) device, a New Radio (NR)-enabled relay node, or a mmWave-enabled communication device.

4. The communication device of claim 1, wherein the control circuitry is further configured to monitor a radio channel that comprises measurement of a frequency ripple of the radio channel and a transmitter signal strength indicator (TSSI).

5. The communication device of claim 1, wherein the control circuitry is further configured to detect a loop gain based on a measured frequency ripple of a radio channel and a transmitter signal strength indicator (TSSI), and wherein the loop gain indicates a current system state of the communication device that is at least one of a stable system state, a quasi-stable system state, or an unstable system state.

6. The communication device of claim 5, wherein the control circuitry is further configured to:
- adjust a forward gain related to the service Tx from a first level to a second level; and
- detect a change in the amount and the direction of the echo signals that corresponds to the reflected RF signals from the environment at the donor Rx based on the adjusted forward gain; and
- re-calibrate the polarization in accordance with the detected change in the amount and the direction of the echo signals that corresponds to the reflected RF signals to reduce the reflected RF signals at the donor Rx.

7. The communication device of claim 5, wherein the control circuitry is further configured to reduce a forward gain to lower the loop gain towards less than or equal to zero decibels (dB) based on the unstable system state, and wherein the current system state of the communication device is restored to the quasi-stable system state from the unstable system state based on a reduction in the forward gain.

8. The communication device of claim 5, wherein the control circuitry is further configured to reduce a forward gain to lower the loop gain to less than zero decibels (dB) based on the quasi-stable system state of the communication device, and wherein the current system state of the communication device is restored to the stable system state from the quasi-stable system state based on a reduction in the forward gain and an echo suppression operation at the communication device, and and wherein the echo suppression operation comprises a change in a radiation pattern of one or more beams of RF signals transmitted from the service Tx that includes the second beam of RF signals and re-calibration of the polarization to minimize the signals that are reflected back to the donor Rx.

9. The communication device of claim 5, wherein, in the stable system state of the communication device, the control circuitry is further configured to adjust a forward gain such that the second radiation pattern of at least the second beam of RF signals is optimized for maximization of a coverage and minimization of the reflected RF signals.

10. The communication device of claim 1, wherein the reflected RF signals corresponds to RF signals which are previously transmitted by the service Tx and re-appears at the donor Rx.

11. The communication device of claim 1, wherein the second radiation pattern corresponds to a wide beam pattern in an event the amount of the reflected RF signals is zero.

12. The communication device of claim 1, further comprising a polarization controller configured to adjust a polarization angle of the second beam of RF signals to minimize the echo signals at the donor Rx.

13. The communication device of claim 1, further comprising a beamforming circuit configured to adjust a phase and an amplitude of the second beam of RF signals based on the amount and the direction of the echo signals at the donor Rx for generating the second radiation pattern.

14. A method for managing echo signals in a communication device, comprising:
- receiving a first beam of input radio frequency (RF) signals from a base station or a network node at a donor receiver (Rx);
- transmitting a second beam of RF signals in a first radiation pattern to a user equipment (UE) using a service transmitter (Tx);
- detecting an amount and a direction of echo signals at the donor Rx corresponding to reflected RF signals in an environment surrounding the communication device;
- determining an installation location for the communication device based on echo signal measurements at one or more different locations;
- adjusting polarization of the second beam of RF signals to minimize the echo signals at the donor Rx; and
- generating a second radiation pattern for at least the second beam of RF signals based on the amount and the direction of the echo signals in the environment detected at the donor Rx.

15. The method of claim 14, further comprising monitoring a radio channel that comprises measurement of a frequency ripple of the radio channel and a transmitter signal strength indicator (TSSI).

16. The method of claim 14, further comprising detecting a loop gain based on a measured frequency ripple of the radio channel and a transmitter signal strength indicator (TSSI), wherein the loop gain indicates a current system state of a communication device that is at least one of a stable system state, a quasi-stable system state, or an unstable system state.

17. The method of claim 16, further comprising:
- adjusting a forward gain related to the service Tx from a first level to a second level; and detecting a change in the amount and the direction of the echo signals that corresponds to the reflected RF signals from the environment at the donor Rx based on the adjusted forward gain; and re-calibrating the polarization in accordance with the detected change in the amount and the direction of the echo signals that corresponds to the reflected RF signals to reduce the reflected RF signals at the donor Rx.

18. The method of claim 17, further comprising reducing the forward gain to lower the loop gain towards less than or equal to zero decibels (dB) based on the unstable system state, wherein the current system state of a communication device is restored to the quasi-stable system state from the unstable system state based on a reduction in the forward gain.

19. The method of claim 17, further comprising reducing a forward gain to lower the loop gain to less than zero decibels (dB) based on the quasi-stable system state of the communication device, wherein the current system state of the communication device is restored to the stable system state from the quasi-stable system state based on a reduction in the forward gain and an echo suppression operation at the communication device, and and wherein the echo suppression operation comprises a change in a radiation pattern of one or more beams of RF signals transmitted from the service Tx that includes the second beam of RF signals and re-calibration of the polarization to minimize the reflected RF signals at the donor Rx.

20. The method of claim 17, further comprising adjusting, in the stable system state of the communication device, a forward gain such that the second radiation pattern of at least the second beam of RF signals is optimized for maximization of a coverage and minimization of the reflected RF signals.

21. The method of claim 14, wherein the reflected RF signals corresponds to RF signals which are previously transmitted by the service Tx and re-appears at the donor Rx.

* * * * *